(12) United States Patent
Freehill et al.

(10) Patent No.: US 8,827,069 B2
(45) Date of Patent: Sep. 9, 2014

(54) EXTENDABLE CONVEYOR ASSEMBLY WITH THE SEAL

(71) Applicant: Deere & Company, Moline, IL (US)

(72) Inventors: Justin C Freehill, Fenton, IL (US); Douglas G Temple, Fulton, IL (US); Bruce A Coers, Hillsdale, IL (US); Shane Marty Anderson, Syracuse, UT (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/758,017

(22) Filed: Feb. 4, 2013

(65) Prior Publication Data

US 2014/0216897 A1    Aug. 7, 2014

(51) Int. Cl.
*B65G 15/26*       (2006.01)

(52) U.S. Cl.
CPC ..................................... *B65G 15/26* (2013.01)
USPC ............................ 198/595; 198/588; 198/812

(58) Field of Classification Search
CPC ............................... B65G 21/14; B65G 65/00
USPC ................................... 198/588, 594, 595, 812
See application file for complete search history.

(56) References Cited

U.S. PATENT DOCUMENTS

| | | | | | |
|---|---|---|---|---|---|
| 3,024,893 | A | * | 3/1962 | Lambert | 198/836.1 |
| 3,198,353 | A | * | 8/1965 | McDowell | 414/140.9 |
| 3,344,909 | A | * | 10/1967 | Hansen et al. | 198/836.1 |
| 3,863,783 | A | * | 2/1975 | Spellman, Jr. | 414/523 |
| 4,641,745 | A | * | 2/1987 | Skates | 198/836.1 |
| 5,513,743 | A | * | 5/1996 | Brink | 198/836.1 |
| 5,924,551 | A | * | 7/1999 | Radmall | 198/861.1 |
| 6,533,096 | B2 | * | 3/2003 | Gilmore et al. | 193/35 TE |
| 7,370,753 | B2 | * | 5/2008 | Yang et al. | 198/812 |
| 7,571,802 | B2 | * | 8/2009 | Bowman | 198/836.1 |
| 8,006,831 | B1 | * | 8/2011 | Mackin et al. | 198/860.1 |
| 8,186,502 | B2 | | 5/2012 | Mackin et al. | |

* cited by examiner

*Primary Examiner* — Leslie A Nicholson, III
*Assistant Examiner* — Keith R Campbell

(57) ABSTRACT

A conveyor assembly (26) includes a first frame (50) supporting a first conveyor (28) for feeding material in a first conveying direction. The conveyor assembly (26) also includes a second frame (60) supporting a second conveyor (30) for feeding material in a second conveying direction parallel to the first conveying direction. The second frame (60) is movable with respect to the first frame (50) along the second conveying direction between a retracted position and an extended position. A side shield (70) is connected to a side of the second frame (60) and shields the second conveyor (30) laterally. An elongate, flexible seal (94) is mounted to the side shield (70), the flexible seal (94) bridging a gap between the side shield (70) and the second frame (60).

9 Claims, 5 Drawing Sheets

EXTENDABLE CONVEYOR ASSEMBLY WITH THE SEAL

FIELD

The present invention pertains to an extendable conveyor assembly provided with a seal.

BACKGROUND

Combines are used in agricultural operations to harvest, thresh and separate and finally clean crops grown on a field in order to obtain cleaned grain. The grain is stored in a grain tank and unloaded into a container of a transport vehicle for further processing. While in the past, mainly auger conveyors have been used, it has been proposed recently to use a belt conveyor for unloading the grain from a combine grain tank. Reference is made to the prior art described in U.S. Pat. No. 8,186,502, describing an extendable conveyor with an upper frame and a lower frame. The lower frame is slidably mounted with respect to the upper frame in order to extend and retract the conveyor for unloading respectively transport. Both frames comprise aluminum extrusion profiles and support belt rollers, around which a single belt or two separate belts are running. A cover enclosing the lateral faces of the conveyors and the top of the upper frame is connected to the lower frame. A skirt is mounted to the profile of the lower frame, ending adjacent the upper run of the belt of the lower frame.

It is an object of the present invention to provide an extendable conveyor assembly that is an improvement over the art.

SUMMARY

A conveyor assembly comprises a first frame supporting a first conveyor for feeding material in a first conveying direction. The conveyor also comprises a second frame supporting a second conveyor for feeding material in a second conveying direction parallel to the first conveying direction. The second frame is movable with respect to the first frame along the second conveying direction between a retracted position and an extended position. A side shield is connected to a side of the second frame and shields the second conveyor laterally. An elongate, flexible seal is mounted to the side shield, the seal bridging a gap between the side shield and the second frame. The seal thus prevents conveyed material from falling off the second conveyor and being lost.

Preferably, the seal comprises a proximal part in a first position spaced from the second frame and a distal part in a second position abutting the second frame, wherein the proximal part of the seal extends over a part of a length of the first frame and the distal part of the seal extends over a part of a length of the second frame projecting beyond the first frame.

The respective parts of the seal are preferably arranged to move under control of a guide element mounted in the vicinity of a distal end of the first frame from the first position to the second position as the second frame is moving from the retracted position into the extended position. This movement is reversed, i.e. the guide element moves the seal from the second position into the first position when the second frame moves from the extended into the retracted position.

The guide element can have a first guide surface adjacent the seal. The first guide surface is oriented at the proximal end of the guide element essentially vertical and at the distal end of the guide element inwards and downwards and turns between the proximal and distal end successively from the essentially vertical orientation to the inwards and downwards orientation to move the seal from the first position to the second position when the second frame is moved from the retracted to the extended position. The inwards and downwards orientation corresponds essentially to the orientation of the second frame onto which the seal is to be laid or is a certain degree steeper.

In a preferred embodiment, the seal has an end with two lips that enclose, when in the second position, a nose of a profile element of the second frame. The first guide surface preferably engages an inner surface of an upper lip.

The guide element further preferably has a second guide surface adjacent the seal, the second guide surface oriented at the proximal end of the guide element essentially vertical and at the distal end of the guide element downwards and inwards towards the second conveyor and turning between the proximal and distal end successively from the essentially vertical orientation to the downwards and inwards orientation to move a lower lip of the seal from the a vertical position to a position abutting an outer face of the nose of the profile element of the second frame when the second frame is moved from the retracted to the extended position.

The guide element can be outwardly cranked in the vicinity of its proximal end.

In a preferred embodiment, the first frame comprises two first profile elements supporting the first conveyor. The first profile elements each comprise a vertical wall extending beneath the first conveyor. A projecting element projects inwards from the lower end of the vertical wall. The projecting element is enclosed by a corresponding cavity of a second profile element of the second frame and the guide element is mounted on the vertical wall.

The conveyor assembly according to the present invention can be used for any purpose. It is in particular suited for an agricultural harvesting machine like a combine for unloading grain from a grain tank or for a forage harvester for conveying chopped crop to a transport vehicle.

BRIEF DESCRIPTION OF THE DRAWINGS

An embodiment of the disclosure is described in detail below with reference to the accompanying drawings wherein.

DETAILED DESCRIPTION

Figure 2:
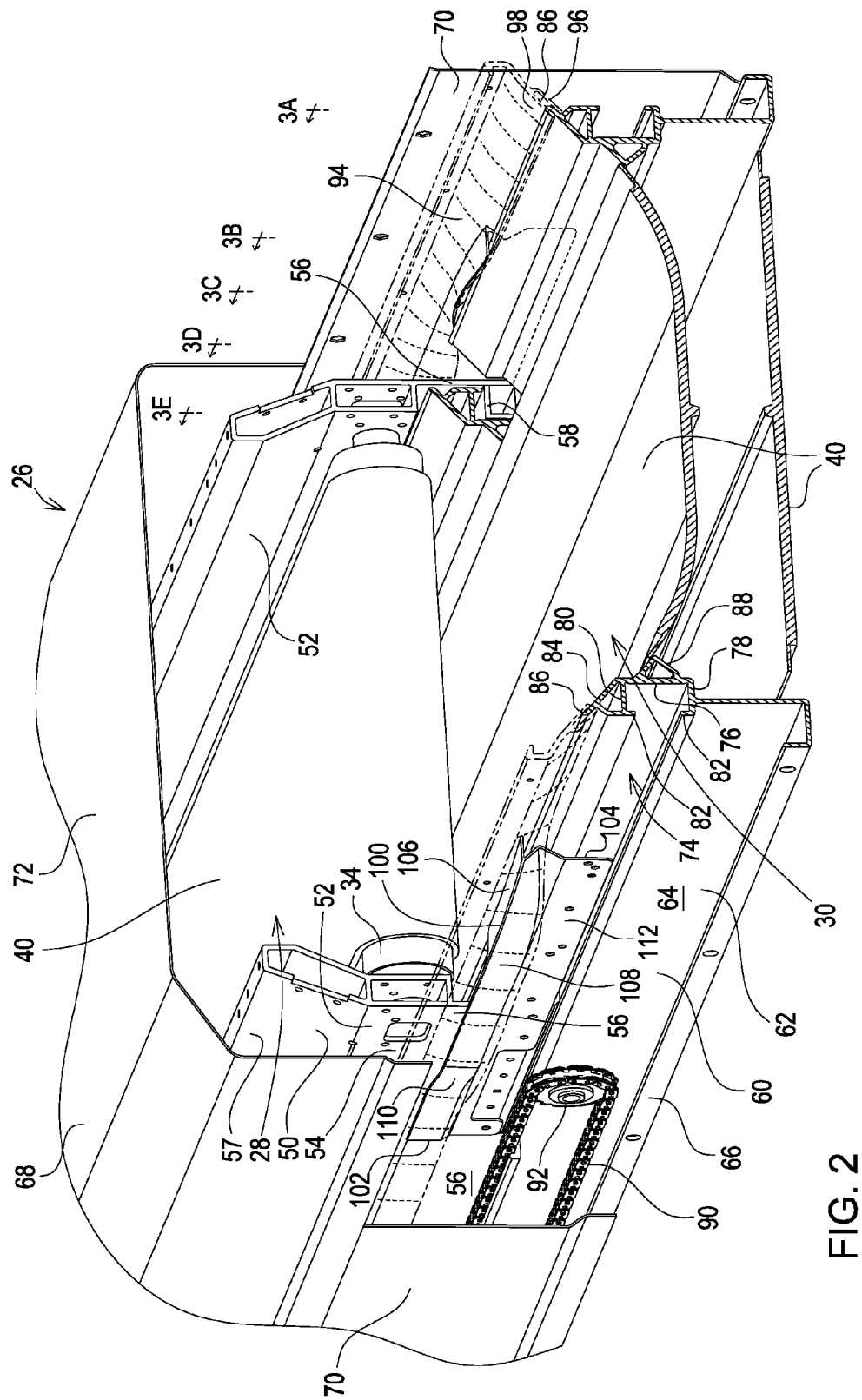
FIG. 2 is a perspective view of conveyor assembly at line 2-2 of FIG. 1.

In the description below, elements of the left side of the conveyor arrangement are described in detail. The elements on the right side of the conveyor are identically constructed, but in mirror image form. These mirror elements are shown in FIG. 2. Any statement herein regarding the construction or operation of elements of the left side of the conveyor arrangement is equally applicable to the elements of the right side of the conveyor arrangement. Likewise, any statement herein regarding the construction or operation of elements on the right side of the conveyor arrangement is equally applicable to the elements of the left side of the conveyor arrangement.

The claims have been drafted to be parsed in the following manner: a claim may refer to a specific number of items, such as "a", "an", "one", "1", "two", "2", et seq. Unless the words "just" or "only" precede these specific numbers, the numbers refer to a minimum number of items and not a maximum number of items. For example, "two" is the logical equivalent of "two or more", or "at least two" etc.

Figure 1:
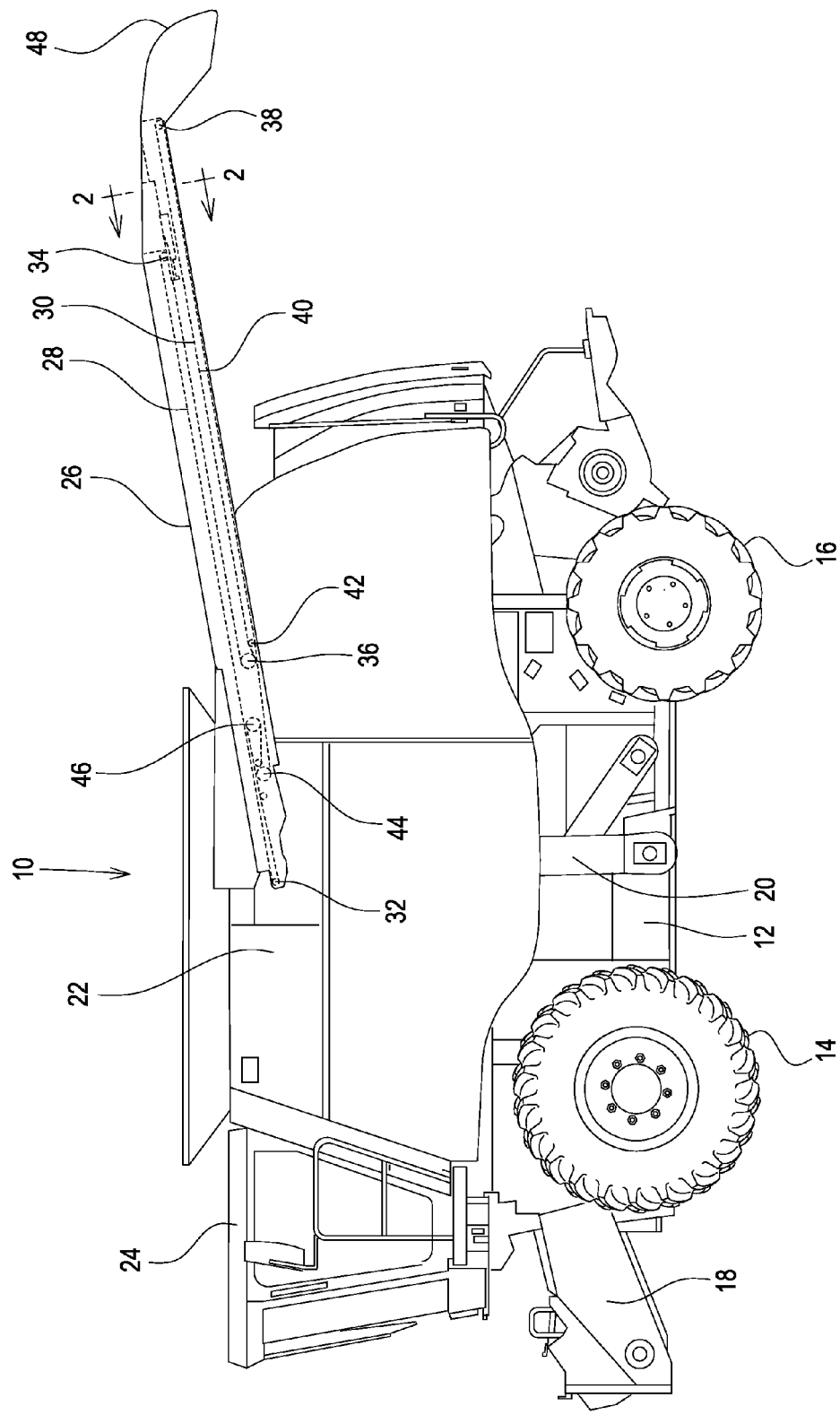
FIG. 1 is a side view of an agricultural combine with a conveyor assembly according to the present invention.

An agricultural combine 10 shown in FIG. 1 comprises a frame 12 supported on driven front wheels 14 and steerable rear wheels 16. Crop harvested from a field by a header (not shown) is fed through a feeder house 18 into threshing, separating and cleaning assemblies (not shown) within the frame 12 and finally cleaned grain is deposited in a grain tank 22 by a clean grain elevator 20. Operation of the combine 10 is controlled from an operator's cab 24. A conveyor assembly 26 is provided for unloading the clean grain from the grain tank 22 into a container of a transport vehicle (not shown).

The conveyor assembly 26 comprises a first conveyor 28 and a second conveyor 30. Each of first conveyor 28 and second conveyor 30 is a belt conveyor having a belt and a plurality of rollers about which the belt is entrained.

In the embodiment shown herein, a belt 40 (a single belt) is entrained around all the rollers that comprise both the first conveyor 28 and the second conveyor 30. The belt 40 recirculates about a roller 32 (which is proximal) and a roller 34 (which is distal) of the first conveyor 28 and recirculates around a roller 36 (which is proximal) and a roller 38 (which is distal) of the second conveyor 30.

The belt 40 also recirculates about a roller 42, a roller 44, and a roller 46. The roller 42, the roller 44, and the roller 46 serve to tension the belt 40. Further, due to this roller and belt arrangement they permit the second conveyor 30 to be extended from the retracted position (shown) to an extended position (not shown). In this extended position, the roller 36 and the roller 38 are moved towards the right hand side with respect to FIG. 1 together with the two lateral profile elements that support each end of the roller 36 and the roller 38.

During an unloading operation, the upper run of the belt 40 that extends between roller 32 and roller 34 of the first conveyor 28 is driven by an assigned motor (electrical or hydraulic, not shown) or a mechanical drive train from an engine of the combine 10, to move outwards, in FIG. 1 towards the right hand side. The upper run of the belt 40 that extends between the roller 36 and the roller 38 of the second conveyor 30 is driven in the same direction as the upper run of the belt 40 that extends between the roller 32 and the roller 34. The upper run of the belt 40 that extends between the roller 36 and the roller 38 receives the material fed by the first conveyor 28 to the second conveyor 30 at the distal discharge point of the first conveyor 28 (i.e. at roller 34).

The upper runs of the belt 40 continuously move from a proximal position that is adjacent to the agricultural harvesting machine 10 to a distal position that is away from the agricultural harvesting machine 10, where the grain is unloaded from the conveyor assembly 26.

The second conveyor 30 can be extended and retracted in a direction parallel to the conveying direction of the belt 40 and parallel to the longitudinal extent of the first conveyor 28 and the second conveyor 30. The conveyor assembly 26 can be moved by an actuator (not shown) to rotate at its proximal end around a vertical axis, and the inclination of the conveyor assembly 26 can be preferably controlled by another actuator (also not shown).

In the extended position (not shown), the conveyor assembly 26 is pivoted with respect to the agricultural harvesting machine 10 to extend perpendicular to the direction of harvesting travel of the agricultural harvesting machine 10. In this position, the conveyor assembly 26 in its extended position enables a grain transport vehicle to be driven alongside the agricultural harvesting machine 10. The grain from grain tank 22 is carried by conventional means to an inlet of the first conveyor 28 located adjacent to roller 32, where it is carried by the upper run of the first conveyor to roller 34, which defines the exit of the first conveyor 28. The grain then falls off the end of the first conveyor 28, and on to the upper run of belt 40 extending between roller 36 and roller 38. The upper run of belt 40 of the second conveyor 30 receives the grain from the first conveyor and carries the grain to an exit spout 48 at the distal end of the second conveyor 30 and the conveyor assembly 26.

In another embodiment, not shown, the first conveyor 28 and second conveyor 30 could be provided with separate belts in place of the belt 40 (illustrated herein) that are driven independently. In this alternative embodiment, one endless belt wraps around and is driven by the rollers that comprise the first conveyor 28, i.e. the roller 32 and the roller 34, and another belt wraps around and is driven by the rollers that comprise the second conveyor 30 i.e. the roller 36 and the roller 38. In this alternative embodiment an additional motor would typically be provided to drive the belt wrapped around the roller 36 and the roller 38.

In FIG. 2, a perspective, partial cutaway view of the first conveyor 28 and second conveyor 30 is shown. The roller 34 of the first conveyor 28 is supported on a first frame 50 that comprises two lateral profile elements 52, which extend over the entire length of the first conveyor 28 and are coupled with the frame 12 of the combine 10 and enclose the first conveyor 28 between them. The lateral profile elements 52 of the first frame 50 each comprise a central hollow, part 54 (which is central and rectangular and in the form of a wall), an upper part 57 directly connected to the top of the part 54, and a vertical wall 56 beneath the part 54, planar with the outer vertical wall of the part 54. The upper part 57 is also hollow and angled towards the center of the first conveyor 28. At the lower end of the vertical wall 56, a projecting element 58 projects inwards toward the center of the conveyor assembly 26. The projecting element 58 has a rectangular cross section and is hollow. The lateral profile elements 52 of the first frame 50 preferably consist of extruded aluminum.

The part of the belt 40 forming the second conveyor 30 is likewise supported on a second frame 60 comprising two lateral profile elements 62 extending over the entire length of the second conveyor 30. The lateral profile elements 62 support the roller 36, the roller 38, and the roller 42 around which the run of the belt 40 forming the second conveyor 30 is entrained, wherein one of the two lateral profile elements 62 is disposed at one end of these rollers to support the rollers at one end for rotation, and the other of the two lateral profile elements 62 is disposed at the other end of these rollers to support the other end of these rollers for rotation. Each of the lateral profile elements 62 comprises a vertical wall 64 to which the shafts of the roller 36, the roller 38, and the roller 42 are mounted. On the lower end of the vertical wall 64, an extension 66 having an L-shape is formed, the outer, vertical leg of which serving to mount a shield 68 comprising a side shield 70 enclosing the sides and a top shield 72 covering the top of the conveyor assembly 26. The side shield is bolted to the vertical legs of extension 66. Above the vertical wall 64, the lateral profile elements 62 form a cavity 74 which is surrounded by an wall 76 that is inner and vertical, a wall 78 that is disposed at a lower end of wall 76 and is oriented generally horizontally, a wall 80 that is disposed at an upper end of wall 76 and is oriented generally horizontally, and upper and lower walls 82 that are oriented to the outside of wall 76 and are coupled to the wall 78, and wall 80, in such a way as to define a gap between upper and lower walls 82. While 76, wall 78, wall 80, and upper and lower walls 82 are oriented with respect to each other to define the cavity 74 such that the projecting element 58 of the lateral profile elements 52 of the first conveyor 28 can be inserted (slid) into the cavity 74. The upper wall 82 also extends above wall 80, turns inwards and merges with a wall 84 that extends vertically and outwardly from the wall 76. A nose 86 of the lateral profile element 62 projects upwardly and outwardly above the junction between upper wall 82 and wall 84, A triangular, hollow extension 88 is provided on the interior face of the upper wall 82. It serves as a support for the belt 40. The lateral profile elements 62 of the second frame 60 preferably consist of extruded aluminum.

Adjustment of the second conveyor 30 between the extended and retracted position is achieved by means of a chain 90 entrained around a sprocket 92 mounted on the vertical wall 56.

An elongate, flexible seal 94 is mounted to the interior faces of the side shield 70. From an outer, upper mounting point on the side shield 70, the flexible seal 94 extends downwards and inwards. At their lower, inner ends, the flexible seal 94 branches into a lower lip 96 and an upper lip 98, enclosing the nose 86 of the lateral profile element 62 of the second frame 60 between them. The flexible seal 94 provides a sealing between the side shield 70 and the (outer, seen in the proximal/distal direction) parts of the lateral profile elements 62 that project beyond the first frame 50. Since the vertical wall 56 extends down from the part 54 of the first frame 50 in order to mount the projecting element 58 within cavity 74 of the lateral profile element 62 of the second frame 60, the flexible seal 94 cannot not touch the lateral profile elements 62 of the second frame 60 that are located directly beneath first frame 50. The proximal areas of the flexible seal 94 are thus oriented essentially vertically in a first position (cf. FIG. 3E) in the vicinity of the outer face of vertical wall 56, while only the distal areas of the flexible seal 94 are in a second position to seal the gap between the side shield 70 and the lateral profile element 62 of the second frame 60. A guide element 100 serves to move the flexible seal 94 between its first and second position as the second conveyor 30 is extended and retracted.

The guide element 100 is mounted at the distal end of the first conveyor 28 and is fixed to the vertical wall 56 of the lateral profile element 52 of the first frame 50. In the proximal/distal direction, the guide element 100 extends from a proximal end 102 behind the front edge of the first frame 50 to a distal end 104 in front of the front edge of the first frame 50. The guide element 100 has a first, inner surface 106 that is nearly vertically or vertically oriented at the proximal end 102 (i.e. the rear end) and inwards and slightly downwards oriented at the distal end 104 (i.e. the forward end), corresponding approximately to the orientation of the nose 86 of the second frame 60 onto which the upper lip 98 is to be laid. Between the proximal end 102 and the distal end 104, the first surface 106 gradually turns from the vertical orientation to the inwards and downwards orientation, as can be seen in FIG. 3A to 3E. The first surface 106 thus extends in its distal part above and beyond the nose 86 towards the inside of the second conveyor 30. In its proximal part, the first surface 106 is located on the outward side of nose 86.

The guide element 100 further has a second, outer surface 108 that is nearly or exactly vertically oriented at the proximal end 102 and downwards and inwards oriented at the distal end 104. Between the proximal end 102 and the distal end 104, the first surface gradually turns from the vertical orientation to the downwards and inwards orientation, as can be seen in FIG. 3A to 3E, as well. The second surface 108 is located on the outward side of nose 86 over its entire length. In the vicinity of the rear end, the guide element 100 is angled outwardly at a position indicated as 110. The first surface 106 and the second surface 108 are separate from each other along their distal part and merge together in the vicinity of the angled position 110. Below the second surface 108, the guide element 100 turns into a vertical flange 112 bolted to the vertical wall 56. The guide element 100 is formed of steel or another suitable material.

Figure 3B:
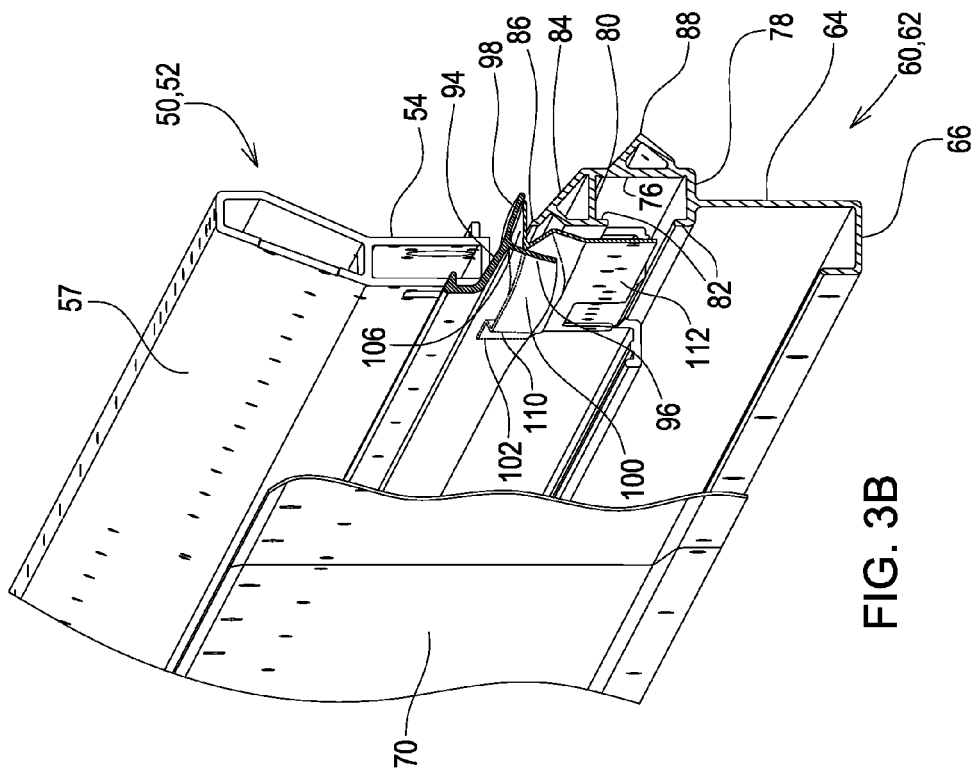
FIGS. 3A to 3E are perspective views of the conveyor assembly at section lines 3A to 3E of FIG. 2.
Figure 3A:
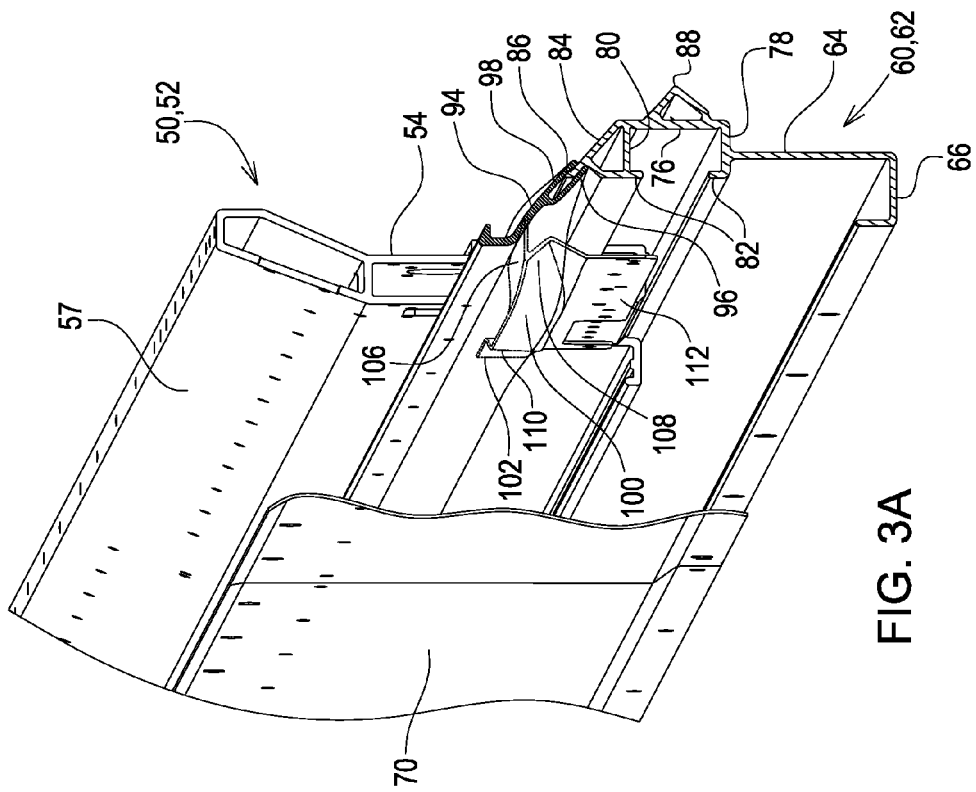

The function of the guide element 100 is illustrated in detail in FIGS. 3A to 3E. FIG. 3A shows the flexible seal 94 in the second position in which the lower lip 96 and upper lip 98 enclose the nose 86 of the lateral profile element 62 of the second frame 60 between them, since the (distal) part of the second conveyor 30 with flexible seal 94 illustrated in FIG. 3A projects beyond the first frame 50. The distal part of flexible seal 94 is thus in its second position closing the gap between the side shield 70 and the part of the length of the second frame 60 that extends beyond the first frame 50. The first surface 106 of the guide element 100 has already penetrated between the lower lip 96 and the upper lip 98.

At the more proximal location shown in FIG. 3B, the lower lip 96 has been moved gradually by the second surface 108 of the guide element 100 off the nose 86 and bent outwards, such that the lower lip 96 extends downwards and outward. The upper lip 98 is likewise moved gradually by the first surface 106 of the guide element 100 off the nose 86 and bent upward, such that it is angled under a shallow slope, thus extending downward and inward.

Figure 3D:
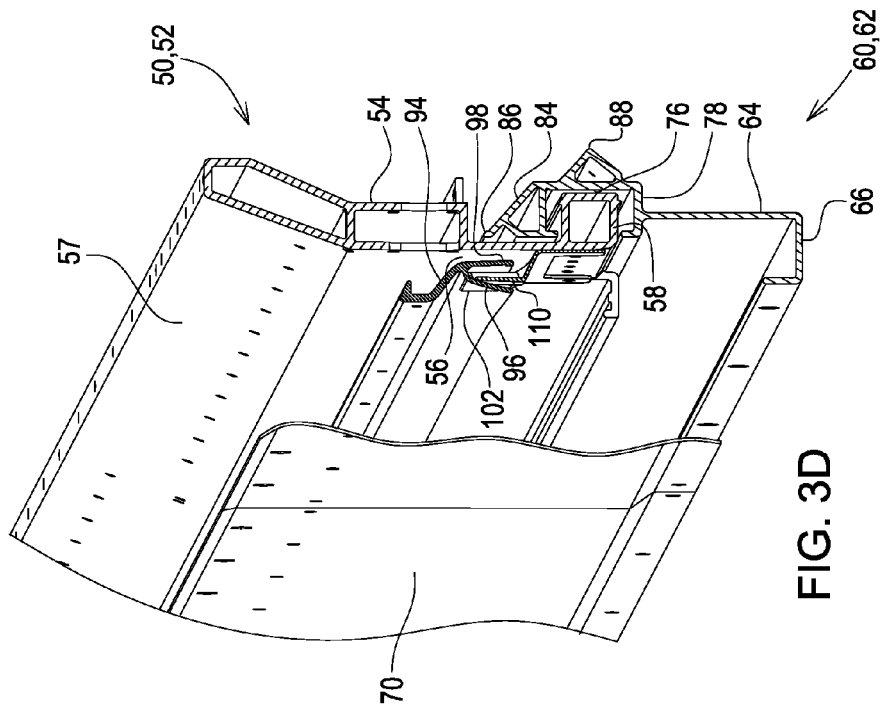
Figure 3C:
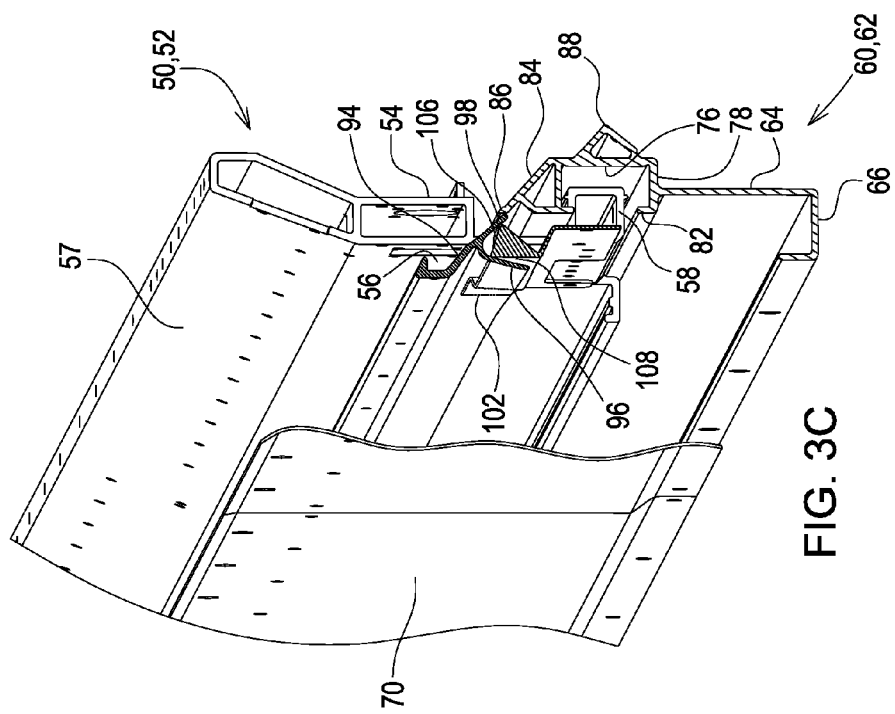

At the even more proximal location shown in FIG. 3C, the lower lip 96 has been moved gradually by the second surface 108 of the guide element 100 into a generally vertical but more outward position, compared with FIG. 3C, such that the lower lip 96 still extends downwards and outward. The upper lip 98 is likewise moved gradually by the first surface 106 of the guide element 100 into a steeper sloped position.

At the even more proximal position indicated in FIG. 3D, in which the flexible seal 94 interacts with the guide element 100 at the angled position 110, the lower lip 96 is only marginally bent outward by the second surface 108, such that lower lip 96 is oriented almost vertical. There is no contact between the upper lip 98 and the first surface 106 and thus upper lip is oriented approximately vertically.

Figure 3E:
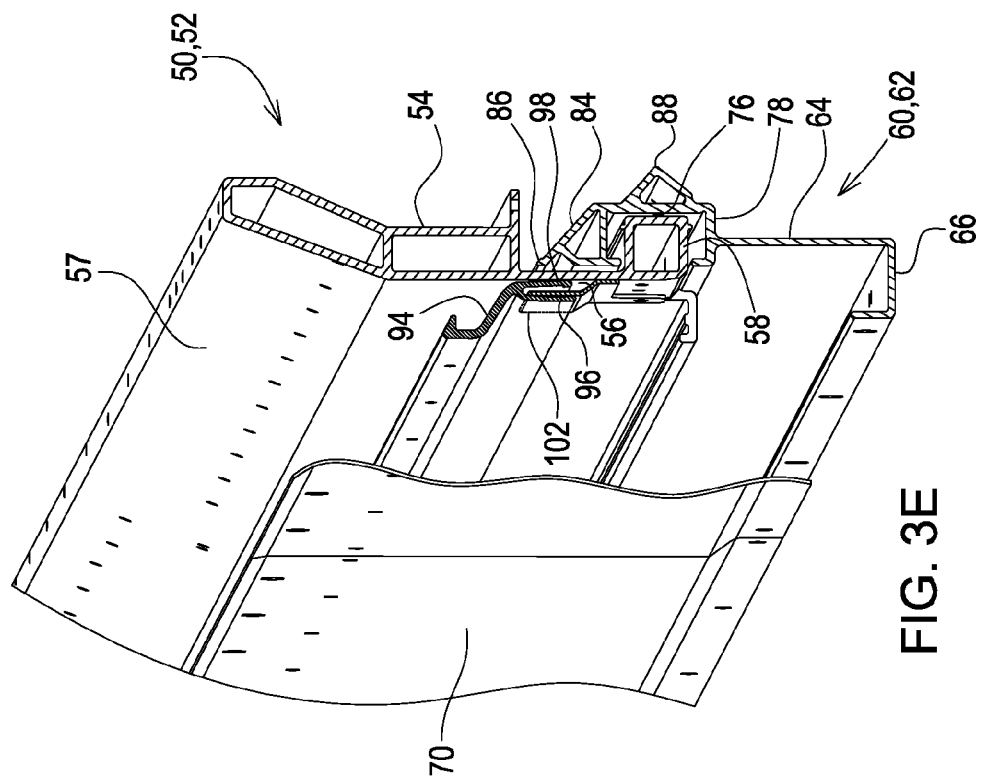

At the position indicated in FIG. 3E, the flexible seal 94 interacts with the proximal end 102 of the guide element 100 and thus both the lower lip 96 and the upper lip 98 are oriented vertically. The upper lip 98 now abuts or is located in close vicinity of the outer surface of part 54. This first position of the flexible seal 94 shown in FIG. 3E applies for the entire proximal part of the flexible seal 94 extending along the first frame 50.

Thus, flexible seal 94 moves into the distal direction with the second frame 60 when the second frame 60 is extended by the corresponding actuator via chain 90 and sprocket 92. The guide element 100 gradually moves the respective parts of the flexible seal 94 at the interface between the first conveyor 28 and the second conveyor 30 from its first position (shown in FIG. 3E) into its second position (shown in FIG. 3A) via the intermediate positions of FIG. 3B to 3D. The guide element 100 with its first surface 106 and its second surface 108 acts like a like slider of a zipper, separating the lower lip 96 and the upper lip 98 such that they can be laid around nose 86. When the second conveyor 30 is retracted again, the guide element 100 also separates the lower lip 96 and the upper lip 98 such that they gradually move back from the second, distal position (FIG. 3A) into the first, proximal position (FIG. 3E), thus inverting the described process during extension of the second conveyor 30.

Having described the preferred embodiments, it will become apparent that various modifications can be made without departing from the scope of the invention as defined in the accompanying claims.

The invention claimed is:

1. A conveyor assembly (26) comprising:
a first frame (50) supporting a first conveyor (28) for feeding material in a first conveying direction;
a second frame (60) supporting a second conveyor (30) for feeding material in a second conveying direction parallel to the first conveying direction, the second frame (60) being movable with respect to the first frame (50) along the second conveying direction between a retracted position and an extended position;
a side shield (70) connected to a side of the second frame, wherein the side shield (70) shields the second conveyor (30) laterally; and an elongate, flexible seal (94) mounted to the side shield (70), wherein the flexible seal (94) bridges a gap between the side shield (70) and the second frame (60),
wherein the flexible seal (94) comprises a proximal part in a first position spaced from the second frame (60) and a distal part in a second position abutting the second frame (60), wherein the proximal part of the flexible seal (94) extends over a part of a length of the first frame (50) and the distal part of the flexible seal (94) extends over a part of a length of the second frame (60) projecting beyond the first frame (50).

2. The conveyor assembly (26) according to claim 1, wherein the respective parts of the flexible seal (94) are arranged to move under control of a guide element (100) mounted in the vicinity of a distal end of the first frame (50) from the first position to the second position as the second frame (60) is moving from the retracted position into the extended position.

3. The conveyor assembly (26) according to claim 2, wherein the guide element (100) has a first guide surface (106) adjacent the flexible seal (94), the first guide surface (106) oriented at the proximal end (102) of the guide element (100) essentially vertical and at the distal end (104) of the guide element (100) inwards and downwards and turning between the proximal and distal end successively from the essentially vertical orientation to the inwards and downwards orientation to move the flexible seal (94) from the first position to the second position when the second frame (60) is moved from the retracted to the extended position.

4. The conveyor assembly (26) according to claim 3, wherein the flexible seal (94) has an end with two lips (96, 98) that enclose, when in the second position, a nose (86) of a profile element (62) of the second frame (60).

5. The conveyor assembly (26) according to claim 4, wherein the first guide surface (106) engages an inner surface of an upper lip (98).

6. The conveyor assembly (26) according to claim 4, wherein the guide element (100) has a second guide surface (108) adjacent the flexible seal (94), the second guide surface (108) oriented at the proximal end (102) of the guide element (100) essentially vertical and at the distal end (104) of the guide element (100) downwards and inwards and turning between the proximal end (102) and distal end (104) successively from the essentially vertical orientation to the downwards and inwards orientation to move a lower lip (96) of the flexible seal (94) from the first position to a position abutting an outer face of the nose (86) of the profile element (62) of the second frame (60) when the second frame (60) is moved from the retracted to the extended position.

7. The conveyor assembly (26) according to claim 2, wherein the guide element (100) is outwardly cranked in the vicinity of its proximal end (102).

8. The conveyor assembly (26) according to claim 2, wherein the first frame (50) comprises two first profile elements (52) supporting the first conveyor (28), wherein each of the first profile elements (52) comprises a vertical wall (56) extending beneath the first conveyor (28), a projecting element (58) projecting inwardly from the lower end of the vertical wall (56), the projecting element (58) being enclosed by a corresponding cavity (74) of a second profile element (62) of the second frame (60), the guide element (100) fixed to the vertical wall (56).

9. An agricultural harvesting machine (10) comprising a conveyor assembly (26) according to claim 1.

* * * * *